United States Patent [19]

Kwasnoski et al.

[11] 4,279,703

[45] Jul. 21, 1981

[54] APPARATUS FOR THE DISTILLATION OF WEAK AMMONIA LIQUOR

[75] Inventors: Daniel Kwasnoski, Hellertown; Charles J. Sterner; Russel J. Horst, both of Bethlehem; Kenneth R. Burcaw, Easton, all of Pa.

[73] Assignee: Bethlehem Steel Corporation, Bethlehem, Pa.

[21] Appl. No.: 99,700

[22] Filed: Dec. 3, 1979

Related U.S. Application Data

[60] Continuation of Ser. No. 934,148, Aug. 16, 1978, abandoned, which is a division of Ser. No. 695,624, Jun. 14, 1976, Pat. No. 4,108,734.

[51] Int. Cl.³ .......................... B01D 3/20; B01D 3/22
[52] U.S. Cl. ................................. 202/158; 202/176; 202/198; 202/234
[58] Field of Search ............... 202/158, 176, 178, 234, 202/198; 203/47, 7, 36, 37, 33, 10, 39, 29, 95–97, 92, 93; 423/357

[56] References Cited

U.S. PATENT DOCUMENTS

| | | | |
|---|---|---|---|
| 1,781,987 | 11/1930 | Means | 203/36 |
| 2,029,467 | 2/1936 | Day | 203/36 |
| 2,315,423 | 3/1943 | Hildebrandt | 203/36 |
| 2,767,966 | 10/1956 | Chave | 202/158 |
| 3,143,482 | 8/1964 | McLeod et al. | 202/158 |
| 3,278,423 | 10/1966 | Millar | 203/36 |

Primary Examiner—Wilbur L. Bascomb, Jr.
Attorney, Agent, or Firm—Joseph J. O'Keefe; Charles A. Wilkinson

[57] ABSTRACT

The fouling of ammonia stills which results from the clogging, particularly of the lower plates of the stills, with sludge and precipitates is eliminated by use of combined apparatus in which a calcium compound precipitation step followed by a clarification step prior to initiation of actual distillation can be effected.

3 Claims, 2 Drawing Figures

APPARATUS FOR THE DISTILLATION OF WEAK AMMONIA LIQUOR

CROSS REFERENCES TO RELATED APPLICATIONS

This is a continuation of application Ser. No. 934,148, filed Aug. 16, 1978, now abandoned which application is a division of U.S. application Ser. No. 695,624 filed June 14, 1976 now U.S. Pat. No. 4,108,734 and is related to a copending application Ser. No. 695,685 filed June 14, 1976 now U.S. Pat. No. 4,108,735 entitled "Method and Apparatus for Improved Distillation of Ammonia from Weak Ammonia Liquor" filed by K. R. Burcaw, Jr., D. Kwasnoski, and E. M. Rudzki.

BACKGROUND OF THE INVENTION

This invention relates to steam distillation of ammonia and ammonium ion compounds from aqueous solutions of such compounds and relates more particularly to the removal of ammonia from the weak ammonia liquor produced during a coking operation.

During the thermal decomposition of coal to produce coke for use in the steel industry various vapors and gases are given off. These vapors and gases contain a variety of components including tars, light oils, phenols, naphthalenes, hydrogen cyanide, hydrogen sulfide, carbon dioxide, ammonia and water. The vapors and gases are customarily initially cooled in a primary cooler. During this cooling the excess moisture condenses and absorbs ammonia, ammonium compounds and other lesser contaminants and is then known as weak ammonia liquor. The weak ammonia liquor, or WAL, may be recirculated through the primary cooler several times until the WAL becomes saturated with ammonia and other constituents and must be treated to remove the ammonia.

For perhaps as long as 100 years, direct contact countercurrent steam stills have been used to remove ammonia from the weak ammonia liquor generated during the coking of coal. As is more fully described in the U.S. Steel publication, "The Making, Shaping and Treating of Steel", 9th ed., Harold E. McGannon, Ed. (1971) pp 165 et seq, the most prevalent process for extracting ammonia from weak ammonia liquor is the Semi-Direct Process. In this process, weak ammonia liquor is first steam distilled in a so-called "Free" leg to remove the "free", or thermally decomposable, ammonia, i.e. ammonium compounds which are readily dissociated by heat. Exemplary "free" ammonia compounds are ammonium carbonate, ammonium sulfide and ammonium cyanide, which compounds when decomposed, form ammonia and carbon dioxide, ammonia and hydrogen sulfide, and ammonia and hydrogen cyanide respectively.

Following the first steam distillation in the free leg, the once distilled weak ammonia liquor is combined with an excess of an aqueous slurry of calcium hydroxide, or "milk of lime" in a "Lime" leg. By combination of the predistilled liquor with milk of lime, the "fixed", or non-thermally decomposable, ammonium ion compounds contained in the liquor, i.e. ammonium chloride, ammonium thiocyanate and ammonium sulfate, are subjected to an alkaline environment where a chemical reaction takes place in which the ammonium ion is converted to ammonia and water. The resulting weak ammonia liquor-milk of lime (WAL/MOL) suspension or slurry, containing sufficient lime, both solid and dissolved, to give a CaO to $NH_4^+$ molar ratio of not less than 1:2, is then allowed to overflow into the "Fixed" leg of the ammonia still, where a direct contact countercurrent flow of steam extracts the hydrated ammonia from the descending WAL-MOL slurry. As the ammonia is driven from the descending liquor slurry, the equilibria present in the slurry, shown in equations I and II

$$Ca(OH)_2 \rightleftharpoons Ca^{2+} + 2OH^- \qquad (I)$$

$$NH_4^+ + OH^- \rightleftharpoons NH_3 + H_2O \qquad (II)$$

are shifted to the right with the result that solid Ca(OH)$_2$ dissolves continuously as the liquor descends, and substantially all the ammonium ion present in the liquor is converted to ammonia and driven off.

The free and the fixed legs of the ammonia still are of similar construction and are each comprised of an upright column having internally disposed horizontal plates or trays. Each plate or tray is equipped with gas-liquid contacting means through which ascending steam may pass. The gas-liquid contacting means are conventionally either sieve holes or bubble cap assemblies.

In operation liquor enters the top of the still column and flows from tray to tray, either through downcomers in each plate or through dual flow sieve tray orifices, countercurrently with ascending steam and vapors, to the bottom of the column where an effluent port allows the deammoniated liquor, or so-called still bottoms, to be discharged to a storage vat prior to further processing.

The fixed leg and the free leg are normally interconnected in such a way that the steam introduced at the bottom of the fixed leg, passes directly from the top of the fixed leg to the bottom of the free leg and continues upwardly to the top of the still where the steam, along with entrained ammonia and acid gases, leaves the still. Once this steam/ammonia/acid gas stream leaves the top of the free leg, it may be routed to a dephlegmator to condense a portion of the steam and thence either to a sulfuric acid saturator to produce ammonium sulfate or to an incinerator for the combustive destruction of the gases.

One major drawback in the use of such a conventional ammonia still is the tendency of the column to become plugged or fouled. Once a column has been in operation for a period of time, solid calcium compounds tend to accumulate around the gas-liquid contacting means, i.e. the bubble caps or sieve tray openings, thereby restricting and eventually interrupting or interfering with the upward flow of steam. Such interruption or interference, of course, reduces the efficient intercontact of steam and liquor and therefore reduces the efficiency of ammonia removal from the liquor. When this occurs, the tower must be cleaned, a process which requires that it be taken out of service, dismantled and the calcium solids removed from the tray openings. Such removal is not only costly in man hours spent cleaning, but also necessitates either adequate storage facilities for the liquor accumulated during the still down-time or, alternatively, a duplication of ammonia still facilities whereby one facility may be used while the other is being cleaned.

Furthermore, since the still becomes fouled quite rapidly between cleaning stages, the still is inevitably operated for a large percentage of time between cleaning in a partially blocked condition. Ammonia stills for the distillation or stripping of weak ammonia liquor derived from coal coking operations have in the past, therefore, been designed with considerable excess capacity and with relatively low liquid to gas ratios. This is accomplished by designing the individual plates larger so that more total open area for passage of steam through the plates is available than would normally be necessary during unfouled operation. The increased open area is provided to insure passage of adequate steam at all times for effective stripping of ammonia from the liquor both when the column is clean and when the column is partially fouled. This arrangement, however, results in relatively more steam overall being required for operation of the still, with a consequent high consumption of steam compared to that which would be required if the still was designed only for that amount of steam which would be required for efficient stripping during unfouled operation. In other words, if no fouling and plugging occurred, a still could be designed for the passage of relatively less steam per amount of liquor passed through the still. In most cases this would mean that the still would require a lesser diameter with respect to either its height, or more particularly its rated throughput of capacity, because the total surface area of each tray or plate could be reduced. The usual molar liquid/gas ratio in conventional ammonia stills is in the range of 3 to 5.

One solution to the fouling problem is described in the March, 1975 issue of I&SM in an article by A. C. Naso and J. W. Schroeder entitled "A New Method of Treating Coke Plant Waste Waters", beginning at page 34. In this process, caustic soda is substituted for milk of lime and is added to the liquor prior to distillation. By this substitution, calcium ions are eliminated entirely from the process thereby obviating the problem of calcium solids formation in the still. The sodium compounds formed are soluble and thus do not result in fouling and plugging of the still. While this solution is effective in eliminating column fouling, the cost of caustic soda as compared with that of lime renders the use of such a process economically unsatisfactory. Although the authors of the cited article claim that their process can be made economically feasible, this cannot be accomplished without extensive replacement or redesign of existing ammonia still equipment.

In light of the foregoing, there exists a need for a process which will economically eliminate the problems associated with ammonia still fouling.

SUMMARY OF THE INVENTION

The fouling and plugging problems which have plagued prior art ammonia stills have been obviated by this invention. Studies of the operation of an ammonia still have resulted in the finding that the fouling which occurs in such stills is, in reality, of two separate and distinct types. The first type is that described in the commonly assigned application entitled "Method and Apparatus for Improved Distillation of Ammonia from Weak Ammonia Liquor" referred to above under the heading of "Cross References to Related Applications". This first type of fouling occurs primarily in the bottom plates of the free leg of conventional ammonia stills due to the reaction between calcium ions entrained in the steam ascending from the fixed leg and fluoride and carbonate ions contained in the weak ammonia liquor descending through the free leg. The calcium carbonate and calcium fluoride solids which form as a result of this reaction plug the sieve holes or bubble caps of the bottom plates of the free leg.

In addition to this first type of plugging there is a second type which results in the fouling of the fixed leg. This second type of fouling results primarily from the presence of calcium compound particles in the WAL-MOL slurry passing through the distillation column. This slurry contains not only milk of lime, $Ca(OH)_2$, particles, but also particles of calcium salts precipitated in the liming chamber, i.e. $CaCO_3$, $CaF_2$, $CaSO_3$, $CaSO_4$, particles etc. Over a period of time, an accumulation of these solids results in blockage of the still. The first type of fouling and plugging thus is primarily a precipitation buildup phenomenen in which adherent solids are deposited directly from solution upon a surface, particularly in the vicinity of the gas orifices in the trays of the still. The second type of fouling and plugging is, on the other hand, primarily a sedimentation or sludging type of fouling in which deposits of solid materials which have already been precipitated, or else never dissolved, accumulate in areas of reduced liquid flow, such as around sieve orifices or bubble caps, gradually reducing the capacity and efficiency of the distillation column.

While it might at first be imagined that the sedimentary or sludge accumulations are composed primarily of accumulated undissolved lime particles derived directly from the original lime added as milk of lime, it has been found that a significant or even major proportion of the sludge is derived from precipitated calcium carbonate, fluoride and other compounds.

Despite the problems associated with the practice of directing WAL-MOL slurry through the fixed leg of the still, this practice has been followed for many years. Undissolved lime particles have been passed through the still because of the belief that it was necessary to have an excess of milk of lime present in order to ensure an adequate supply of alkalinity to convert ionized ammonium compounds into free hydrated ammonia within the distillation column. Precipitated calcium compounds in addition to undissolved solids initially contained in the lime have passed through the still column along with the lime.

The present inventors have discovered that the fouling associated with calcium solids accumulation in the fixed leg of a weak ammonia liquor still can be eliminated by initially precipitating calcium compounds from the weak ammonia liquor by the use of lime and then removing virtually all the solids from the limed weak ammonia liquor prior to distillation. This preliminary precipitation of calcium compounds is referred to herein as pre-precipitation. It has further been discovered there is no detrimental effect on the amount of ammonia removed from the liquor by so removing suspended solids from the liquor prior to entry into the still. The solids removal process may comprise any one of several solid/liquid separation methods including filtration, centrifugation, settling-clarification, etc., or any combination thereof. However, it is preferred to clarify the WAl-lime, or WAL-MOL, solution prior to addition to the still. It is also preferred to distill the weak ammonia liquor in a single leg ammonia still subsequent to the pre-precipitation and clarification step.

DESCRIPTION OF THE PREFERRED EMBODIMENT

Figure 1:
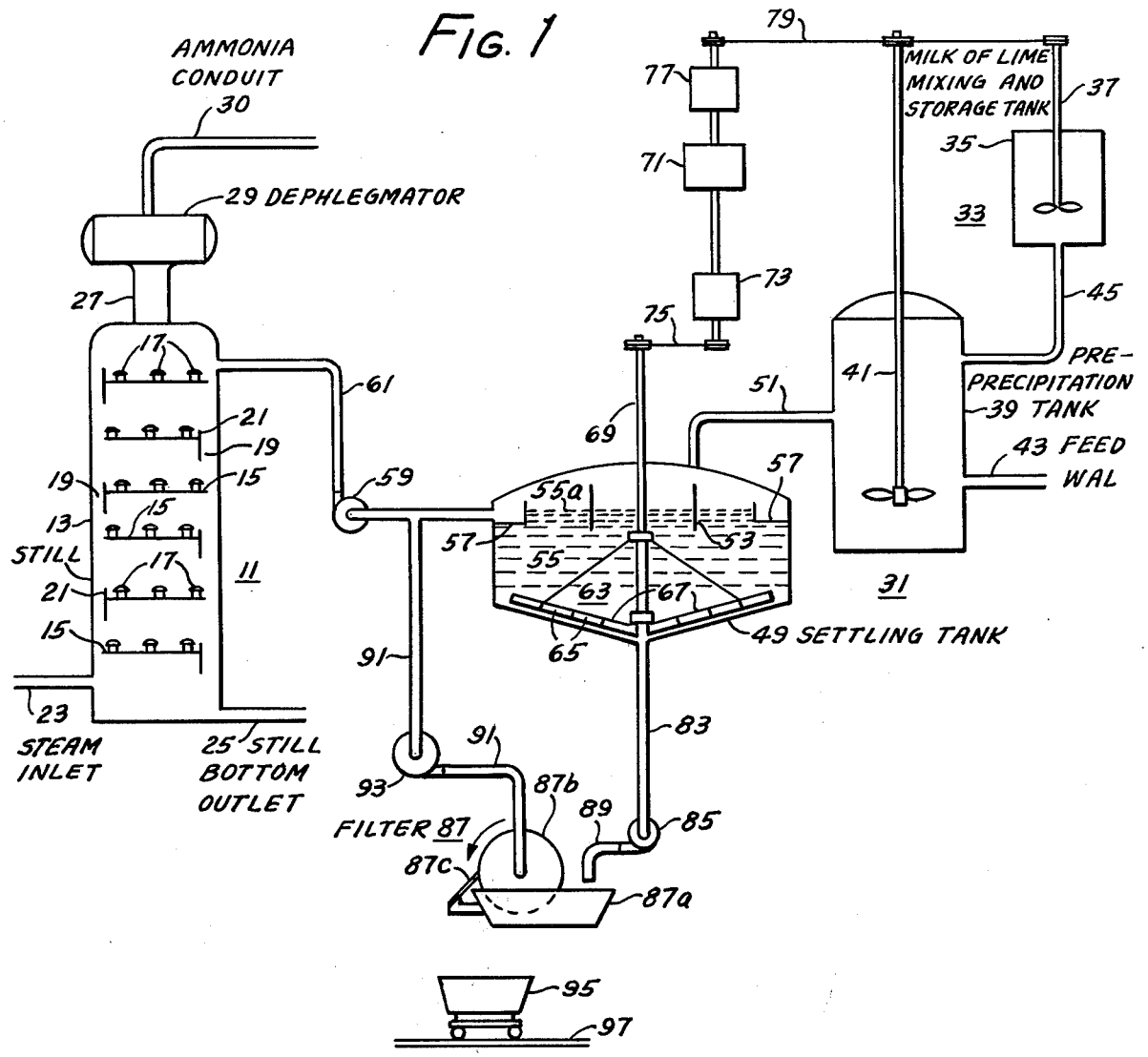
FIG. 1 shows a schematic representation of the preferred apparatus for carrying out the process of the invention.

A full and complete understanding of the present invention will be gained by those skilled in the art from the following description. In FIG. 1 there is shown an apparatus comprising a single leg weak ammonia liquor still 11 comprised of a shell 13 in which are mounted a series of bubble cap trays 15 having bubble caps 17 more or less evenly spaced upon the trays. The shell 13 together with the trays mounted therein provides a containment means in which distillation or stripping of weak ammonia liquor may be accomplished by countercurrent contact with steam or other stripping gas. A series of downcomers 19 are provided at alternate opposite sides of the bubble cap trays for the passage of weak ammonia liquor from tray to tray downwardly through the still. As is well known to those skilled in the art, each bubble cap assembly is provided with a central chimney and gas orifice through which steam, other vapors and/or other stripping gas may pass upwardly through the still column countercurrently with respect to the descending liquor. Because of the construction of the bubble cap assemblies and the level of liquor established upon the surface of the plate by weirs 21 associated with the downcomers 19, liquor does not actually descend through the bubble cap assemblies, but very intimate contact between the liquor and the steam is attained as the steam ascends through the still column. While it is preferred to use bubble cap trays, it will be understood that other types of gas/liquid contact arrangements may also be used such as particularly, for example, conventional sieve trays, dual flow sieve trays, or even other types of gas-liquid contact arrangements such as, for example, a packed tower type arrangement or possibly even a spray type tower or a gas sparging arrangement.

Steam is admitted to the bottom of the still 11 just below the lower tray via a steam inlet 23. Limed weak ammonia liquor enters the top of the still via liquor feed conduit 61. Hot stripped weak ammonia liquor, commonly referred to as still bottoms, passes from the still via outlet conduit 25. Stripped ammonia vapor and residual steam pass from the top of the still 11 via vapor outlet conduit 27, dephlegmator 29, and ammonia conduit 30 to some further treatment or disposal, not shown.

In order to pre-precipitate calcium solids which might otherwise precipitate in the still itself and to remove both pre-precipitated solids and solid undissolved lime particles and the like from the weak ammonia liquor prior to initiation of distillation, there is provided a pre-precipitation and clarification arrangement or apparatus indicated broadly as 31. The pre-precipitation portion 33 of this arrangement is essentially the same as disclosed in the copending application previously referred to under the heading "Cross References to Related Applications" and entitled "Method and Apparatus for Improved Distillation of Ammonia from Weak Ammonia Liquor", the disclosure of which application is hereby incorporated by reference herein.

The pre-precipitation apparatus comprises principally a milk of lime mixing and/or storage tank 35 having an agitator 37 mounted therein and a pre-precipitation and mixing chamber or tank 39 also provided with an agitator 41. There is also a WAL feed conduit 43 leading to the bottom of the pre-precipitation and mixing chamber 39, and a lime solution feed conduit 45 leading from the mixing and/or storage tank 35 to the pre-precipitation chamber 39.

The clarification apparatus portion of the pre-precipitation and clarification arrangement 31 is comprised principally of a large settling tank or thickener 49 into which a weak ammonia liquor-milk of lime (WAL-MOL) slurry or suspension is passed from the pre-precipitation and mixing chamber 39 via feed conduit 51. The suspension is directed into the thickener tank 49 inside a baffle ring 53 which forms a feed well extending into the surface of the liquid body 55 maintained in the thickener 49. Clarified limed weak ammonia liquor, i.e. a clear solution of calcium hydroxide and calcium salts in WAL, overflows from the liquid body 55 into a circumferential overflow trough or launder 57 and is then transferred by pump 59 via liquor feed conduit 61 to the top of still 11 where it enters the still above the uppermost tray or plate. The thickener 49 is provided with a conventional rake arrangement 63 having individual blades 65 supported by rake arms 67 which are mounted upon a rotatable shaft 69. The shaft 69 is rotated slowly by motor 71 and gear reducer 73 via belt drive 75. As illustrated in the FIGURE, motor 71 may also be used to rotate the agitators 41 and 37 in pre-precipitation chamber 39 and mixing tank 35 respectively via a second gear reducer 77 with a higher gear ratio and a belt drive 79.

It may sometimes be desirable to provide vents, not shown, in the top of either the mixing tank 39 or the settling tank 49. However, the vapor pressure of ammonia in the unheated ammonia liquor is not high and such vents will be found usually to be unnecessary.

A sludge removal outlet 83 leads from the bottom of the thickener 49 to a slurry pump 85 which serves to pump pre-precipitated calcium compounds and unreacted lime to a suitable solid dewatering device such as, for example, a drum filter 87, via conduit 89. A filtrate conduit 91 leads from the filter 87 via a filtrate pump 93 to the liquor feed conduit 61. A filter collector 95 shown diagrammatically as a movable cart 95 on tracks 97, is provided under the drum filter 87 to catch or collect filter solids from the filter.

Referring to FIG. 1, during operation untreated weak ammonia liquid containing both fixed and free ammonia is fed through weak ammonia liquor feed conduit 43 into precipitation and mixing tank or chamber 39. Milk of lime is passed from mixing and/or storage tank 35 through conduit 45 to pre-precipitation chamber 39, where it is thoroughly mixed with the weak ammonia liquor. It will be understood that the milk of lime may either be originally formed in tank 35 by mixing together lime with an appropriate amount of water or may be made up at some other location and merely stored until used in the tank 35.

After a residence time in pre-precipitation chamber 39 sufficient for all reaction between calcium cations and various anions in the WAL to be completed, the resultant thin slurry or suspension composed of Ca(OH)$_2$ dissolved in WAL plus undissolved lime solids and pre-precipitated lime compounds, such as in particular calcium carbonate and calcium fluoride, is passed through conduit 51 into the settling tank or thickener 49 where the solids are allowed to settle to the bottom of the tank leaving clarified, limed liquor at the top of the tank. The solids in the form of a heavy slurry are continuously urged by the rake 63 toward the sludge removal outlet 83 and are pumped by slurry pump 85, which may be a diaphragm pump or other pump suitable for pumping a thick slurry, through sludge conduit 89 to the rotatable drum filter 87. The slurry is fed via conduit 89 as diagramatically illustrated in FIG. 1 first into a slurry retainer or trough 87a of filter 87. The drum 87b of the filter 87 dips into the slurry trough 87a as the drum rotates and in response to a partial vacuum maintained in the drum a layer of solids is formed upon the surface of the drum which, as the drum rotates as shown by the arrow in the FIGURE, is first dried by having the liquid components of the slurry drawn into the drum and then by the passage of air through the remaining layer of damp solid particles. The remaining layer of solid particles is then scraped from the drum 87b by a scraper blade 87c and the solids deposited by the action of gravity into sludge collector cart 95 which is movably supported upon tracks 97. The deliquefied sludge is then transported periodically by the cart 95 either to disposal or to further treatment. Such further treatment may include further washing to remove the last traces of liquor, or alternatively such washing could be accomplished initially upon the filter drum 87b in a conventional manner. After thorough washing and possible further separating steps the sludge may, if there is sufficient remaining free calcium hydroxide, be reused mixed with fresh lime to form the milk of lime suspension used in mixing tank 35. It may be preferable to discard a portion of the sludge, or at least to treat a portion to remove extraneous calcium compounds from the calcium hydroxide portion, prior to reuse in order to prevent a build-up of compounds such as calcium fluoride and the like. Naturally if the sludge is merely discarded there is no difficulty with any such build-up and any subsequent treatment of the sludge does not form a part of the present invention. In many operations, the sludge will contain very little remaining calcium hydroxide and will not be reusable. The filtrate liquid passing through the filter drum 87b is pumped through filtrate conduit 91 by filtrate pump 93 to the limed-WAL feed conduit 61.

Meanwhile, the clarified limed liquor which collects at the top of settling tank 49 and overflows into launder 57 is drawn through conduit 61, combined therein with filtrate liquor from conduit 91, and forced by pump 59, through liquor feed conduit 61 to ammonia still 11, where the ammonia is stripped by the action of steam flowing countercurrently to the ammonia liquor to provide a stream of ammonia vapor exiting from the still through ammonia vapor outlet conduit 27.

The ammonia vapors from the ammonia vapor outlet 27 passes through a partial condenser, or dephlegmator, 29 where a portion of the vapor is condensed, enriching the ammonia content of the remaining vapor. The enriched vapor leaves the dephlegmator through conduit 30 and is usually rerouted into the coke oven gas which has been formed during the coking operation prior to the time the coke gas reaches the usual ammonia absorption apparatus such as an absorption tower or saturator. Other arrangements for treating the ammonia are also possible in which, for example, the ammonia is destroyed by oxidation or recovered in separate ammonia absorption apparatus. The further treatment of the ammonia does not constitute a part of this invention.

The stripped weak ammonia liquor, after descending through the still from tray to tray countercurrently with the steam and/or other stripping medium rising through the still, collects in the bottom of the still and is discharged from still bottoms effluent conduit 25.

The clarified limed-WAL which enters the top of the still via the liquor feed inlet 61 passes downwardly through the still from tray to tray without any significant precipitation of calcium compounds from the liquor and without the deposition of any significant sludge on the trays. Once substantially all the precipitable calcium compounds are precipitated from the liquor in the pre-precipitation chamber 39 and these precipitated solids plus the original undissolved calcium hydroxide particles from the lime are removed from the liquor in the thickener 49 the clarified lime-WAL solution remains substantially clear over long periods even as the ammonia is stripped from the solution by contact with the rising steam and/or other stripping gas in the still. There is neither a precipitation of calcium solids about the tray orifices in any of the trays similar to the deposition which has been discovered in the lower trays of the free leg of the usual still, nor the sedimentation experienced in prior stills in the fixed leg due to an accumulation of undissolved lime particles and already precipitated calcium compound particles. Although the WAL-lime solution remains substantially clear and has no undissolved lime to serve as a reservoir of alkalinity to free the last of the ammonia in the solution, the clear solution of lime has sufficient alkalinity to allow stripping of all ammonia. Previously it had been thought that an excess of solid lime was necessary in the liquor to serve as a reservoir from which additional solid calcium hydroxide would continuously dissolve as the ammonia was freed.

The condensate from the condensor or dephlegmator 29 returns to the still 11 via the vapor outlet conduit 27 and dilutes the clarified limed weak ammonia liquor feed which enters the top of the still via the liquor feed conduit 61. Such dilution of the feed has been found to be desirable to make certain that the concentrations of calcium compounds in the entering liquor are below their saturation levels, hence minimizing the possibility of precipitation of solid calcium compounds in the still as distillation progresses and ensuring that the liquor in the still remains substantially clear. While dilution of the clarified liquor in the still is not always essential to prevent substantial precipitation from the liquor in the still, and it is not usually essential to use all of the condensate for dilution, it has been found to be highly desirable to provide a degree of dilution in order to make certain that the clarified solution remains clear as stripping of the solution proceeds. This is especially true since some calcium compounds such as the sulfite and hydroxide exhibit inverse solubility.

If dilution from the returning condensate is not provided, it may be desirable to direct some dilution water into the top of the still from any suitable alternative source. Such alternative dilution water may be incorporated into the clarified limed weak ammonia liquor as it passes through the feed liquor conduit 61 rather than in the top of the still. In some instances it may be desirable to direct some dilution water from an external source into the feed liquor while it is in the feed liquor conduit even though the liquor is ultimately diluted by condensate when it enters the top of the ammonia still. Such additional dilution may be effected if any sign of precipitation is noted in the conduit 61. Dilution water for inclusion in the feed conduit can conveniently be obtained by directing some condensate from dephlegmator 29 through a separate bypass line, not shown in the FIGURE, directly into the conduit 61. If the solids on the filter drum 87b are washed on the drum and the wash liquor directed with the filtrate via line 91 to the conduit 61 a satisfactory amount of dilution water will normally be obtained in feed conduit 61. It will be understood that it will be desirable to use only sufficient dilution water to make absolutely certain that no precipitation of calcium compounds occurs. Too much dilution will adversely effect the steam consumption. Normally only minimum dilution, which can be supplied by use of part or all of the condensate from the dephlegmator, will be sufficient to prevent precipitation during distillation of the initially saturated liquor feed derived from the clarifier.

The molar liquid to gas ratio of the still column, based on flows entering the column, will desirably be within a range of 5 to 10 and more preferably between a range of 6 to 9. Since substantially no fouling occurs within the still, there is no need to provide excess open area and the most efficient possible liquid to gas ratio can be used. Normally this will also mean that the still column can have a lesser diameter for the same capacity since the active area of the individual trays can be reduced with respect to the area used in conventional stills.

Almost any gas-liquid contact arrangement can be used in the still column since there is no danger of such contact arrangement fouling and plugging. Bubble cap assemblies are a preferred form of gas-liquid contact means because of their superior efficiency. Other gas-liquid means such as sieve trays can also be very effectively used and may even be preferred for some installations. The use of still other types of gas-liquid contact means such as packed towers, spray towers and gas sparging arrangements are also possible since there is little danger of serious fouling of such contact arrangements.

It has been found that the overflow effluent from the pre-precipitation step 31 should have a pH which is maintained at an optimum level. The optimum pH will provide both a minimum residual ammonia in the still bottoms and at the same time an optimum use of lime in the process. If the optimum pH is not attained a low residual ammonia will not be attained in the still bottoms, while if the optimum pH value is significantly exceeded more lime is used than is necessary. The residual ammonia left in the still bottoms rapidly approaches a minimum or limiting value as the pH of the feed to the still increases, with all other variables remaining constant, until an optimum pH is established. Further increases in the pH attained by continued addition of lime do not substantially decrease the residual ammonia in the still bottoms, but do increase the lime consumption and result in excessive use of and cost for lime. In one installation the optimum pH was found to be approximately 10.6. At a lesser pH the residual ammonia value was not minimized, while if the pH significantly exceeded this value the residual ammonia values remained low but the amount of lime used was excessive and unnecessary. It has always been assumed in the operation of weak ammonia stills that an excess of lime, both solid and dissolved, is necessary in order to free the fixed ammonia. Consequently, prior ammonia stills have usually operated with a pH of around 12. A practical operating range for operation in accordance with the invention in the example given was found to be in a range of pH from 10.6 to 11. If a good pH monitoring and control system is available it will be desirable to maintain the pH on the high side of, but as close as possible to, the optimum value or, in other words, in the example given, between about 10.6 and 10.8 or less.

It should be understood that the optimum or limiting value of 10.6 for the pH set forth above is the optimum pH found for one particular weak ammonia liquor. Weak ammonia liquor derived from different coal coking operations may vary in composition and the optimum pH may also be either somewhat higher or somewhat lower. The same type of optimum or limiting value will be found in all instances, however, and can be easily established for any given weak ammonia liquor by a process of trial and error once it is known that an optimum value is involved. To establish the optimum pH value any given distillation column or simulation thereof can be run using various lime additions to attain a series of still feeds with varying pH's while measuring the residual ammonia in the still bottoms. The varying pH's will then be plotted against the residual ammonia values to establish the optimum or limiting value for the pH under a specific set of operating conditions. The pH of the installation should thereafter be operated with a pH of the WAL-MOL slurry before clarification of from the optimum pH which has been established, to about 0.4 of a pH unit above and preferably about 0.2 of a pH unit above the optimum established pH. The pH established between the pre-precipitation and clarification steps remains substantially constant in the limed WAL feed until the liquor enters the still. Previously it has always been considered that an excess of solid lime had to be maintained in the WAL-MOL in order to assure complete stripping of the ammonia from the WAL. Such an excess usually resulted in a pH of 12 or more.

Several ammonia still installations have been designed in accordance with the present invention. As an example of a still constructed to take advantage of the invention and capable of treating 130 to 277 gallons per minute of WAL (492 to 1048 liters/min.), one of these stills incorporates a single leg with the following dimensions and specifications:

Inside Diameter—5 feet (1.52 meters)
Height—60 feet (18.3 meters)
Number of cross flow sieve trays—22 trays
Active surface area per tray—13.6 sq. ft. (1.26 sq. meters)
Perforations per tray ($\frac{3}{8}$ inch (0.95 cm.) dia. openings)—1773 (10% of the active area)
Designed Liquid to Gas Ratio 6.6 (equivalent to a requirement of 1.41 pounds of steam per gallon of WAL) (168 gms/l)

Figure 2:
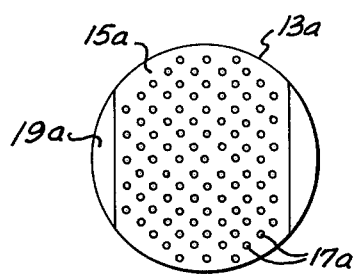
FIG. 2 is a schematic horizontal cross section of a still constructed in accordance with the invention incorporating cross flow sieve trays and showing one of the sieve trays in plan view.

FIG. 2 is a schematic horizontal cross section of an ammonia still constructed in accordance with the specifications of the preceding example of a still using a cross flow sieve tray arrangement and showing one of the sieve trays in plan view where 13a represents the shell of the still, 15a represents a cross flow sieve tray, 19a represent downcomers associated with the cross flow sieve tray, and 17a represents the perforations in the cross flow sieve tray. While the preceding example sepcifies 1773 separate perforations in the sieve tray, for convenience of illustration only a lesser number of perforations are shown in FIG. 2 arranged in a typical pattern for such perforations in a sieve tray.

A conventional still of the same diameter would be capable of treating only approximately half the amount of WAL per any given time period as can be treated by the above still designed to take advantage of the present invention.

While the arrangement shown in the FIGURE has been found to be very satisfactory and desirable it should be understood that other arrangements of equipment may also be used. For example, several pre-precipitation chambers may be used either in parallel or in series, and several settling tanks can be used in series in order to attain more effective clarification. Also, while settling tanks or thickeners are preferred because of their efficiency and relatively trouble free operation, it is also possible to filter all of the solution in any suitable filter arrangement or to use other methods of clarification such as centrifugation and the like. Other filter arrangements for filtering the slurry underflow from the clarification tank means can also be used.

While it would no doubt aid the operation of a conventional ammonia still, i.e. a still including a free leg, a lime leg and a fixed leg, if the effluent from the lime leg was clarified, such clarification of the lime leg effluent would not effectively prevent still column fouling since precipitation in the still column itself would continue, particularly in the free leg. It is necessary, therefore, in order to completely eliminate all fouling of the still column to combine a pre-precipitation step with a clarification step in accordance with this invention. If the WAL is not first subjected to a pre-precipitation step a very significant amount of precipitation will occur in the still column itself. Thus even if the lime leg effluent (of a conventional still containing both a free and fixed leg) were clarified prior to passage of the effluent into the fixed leg, severe fouling of the free leg would occur as fugitive lime solution entrained in the stripping gas first contacted the fresh solution.

It has been unexpectedly found that the use of a pre-precipitation step followed by removal of all solid particles from the slurry is also very effective in removing residual tars from the WAL. Residual amounts of tars are often present in the WAL even after it has passed through the usual tar removal apparatus. This small amount of tar often fouls the still column over a period. These tars seem to become occluded upon the precipitates during the pre-precipitation step, however, and are removed from the liquid during the clarification step of the invention before they get into the still column.

It has also surprisingly been found that the use of a clarification step apparatus in combination with the pre-precipitation step apparatus not only eliminated sedimentation type fouling, but also further reduces the steam requirements for stripping WAL to a desired low residual ammonia content by about 20%. The reduced steam requirements—or higher liquid to gas ratio—is probably due to an increased tray efficiency. This increased tray efficiency does not seem to be related to fouling, but the exact reason for the increase is not understood at this time.

It is necessary in order to take full advantage of the economies and efficiencies of the present invention to use a single leg ammonia still. Thus the present invention comprises essentially a combination of a pre-precipitation step apparatus, which removes precipitatable calcium compounds from the solution, with a clarification step apparatus which removes pre-precipitated solids from the ammonia liquor along with undissolved lime particles. The clarified ammonia liquor is then passed into a single leg ammonia still having a molar liquid to gas ratio in the range of approximately 5 to 10 and preferably 6 to 9. Since the liquid to gas ratio is significantly higher than was possible in the prior art of distilling weak ammonia liquor derived from the coking of coal, a significant amount of steam or other stripping gas or vapor is saved over that which is normally used in such ammonia stills.

The lime, which preferably will be in the form of burnt lime or CaO, will usually be combined with the WAL as a milk of lime suspension, i.e. a $Ca(OH)_2$ suspension in water. However, the lime may also be mixed with the WAL in the form of a lime solution, i.e. a clear solution of $Ca(OH)_2$ in water commonly known as limewater, particularly when only a partial pre-precipitation is to be used, or as an alternative may be mixed directly from the solid state—preferably in a finely ground condition—with the WAL.

Commercial lime contains varying small percentages of magnesium as well as calcium. The magnesium reacts in a manner very similar to the calcium with anions in the WAL. Consequently the pre-precipitation of calcium compounds or salts will broadly include the co-precipitation of magnesium compounds as well. Such coprecipitation may be referred to broadly as the pre-precipitation of lime compounds by premixing lime with weak ammonia liquor.

It will thus be seen that the use of the apparatus of the present invention removes virtually all solids from the limed, weak ammonia liquor prior to distillation. By so doing, the fouling of the conventional still which was due to the accumulation of these solids in the still is substantially eliminated.

We claim:

1. An improved apparatus arrangement for removing free and fixed ammonia from undistilled weak ammonia liquor derived from a coal coking operation while reducing calcium solids accumulation in still apparatus constituting a portion of the improved apparatus arrangement and wherein the undistilled weak ammonia liquor contains both substantial free ammonia as ammonium carbonate, ammonium sulfide and ammonium cyanide and fixed ammonia as ammonium chloride, ammonium thicyanate and ammonium sulfate, comprising in series:
   (a) mixing apparatus for mixing undistilled weak ammonia liquor with lime,
   (b) clarification apparatus means arranged to receive mixed lime-liquor slurry from the mixing apparatus means of (a) and adapted to separate solids from the liquor,
   (c) a single leg ammonia still apparatus means arranged to receive clarified liquor from the clarification means of (b) and adapted to remove ammonia from said clarified liquor by steam distillation, the still apparatus being comprised of a column shell in which are mounted a plurality of liquid supporting trays with a plurality of spaced gas passage orifice means in said trays, the relative surface area of said individual liquid supporting trays with respect to the total orifice area in said trays providing a molar liquid to gas ratio for said trays and the still apparatus of 5 to 10.

Said apparatus arrangement having all distillation apparatus adapted to treat the weak ammonia liquor derived from the coal coking operation positioned in line subsequent to the mixing and clarification apparatus means.

2. An improved apparatus arrangement according to claim 1 wherein the clarification apparatus means comprises a settling tank.

3. An improved apparatus arrangement according to claim 1 wherein the single leg ammonia still apparatus has a molar liquid to gas ratio within a range of 6 to 9.

* * * * *